United States Patent
Tirelli

(10) Patent No.: US 10,845,898 B2
(45) Date of Patent: Nov. 24, 2020

(54) TIP ARRANGEMENT FOR PEN FOR ELECTRONIC DEVICE AND PEN COMPRISING SAID TIP ARRANGEMENT

(71) Applicants: Daniela Merigo, Brescia (IT); Paolo Tirelli, Brescia (IT)

(72) Inventor: Paolo Tirelli, Brescia (IT)

(73) Assignees: Daniela Merigo, Brescia (IT); Paolo Tirelli, Brescia (IT)

( * ) Notice: Subject to any disclaimer, the term of this patent is extended or adjusted under 35 U.S.C. 154(b) by 0 days.

(21) Appl. No.: 16/478,142

(22) PCT Filed: Jan. 12, 2018

(86) PCT No.: PCT/IB2018/050200
§ 371 (c)(1),
(2) Date: Jul. 16, 2019

(87) PCT Pub. No.: WO2018/130980
PCT Pub. Date: Jul. 19, 2018

(65) Prior Publication Data
US 2019/0369756 A1    Dec. 5, 2019

(30) Foreign Application Priority Data
Jan. 16, 2017    (IT) .................. 102017000003943

(51) Int. Cl.
G06F 3/0354    (2013.01)
(52) U.S. Cl.
CPC ................. *G06F 3/03545* (2013.01)
(58) Field of Classification Search
CPC ................................ G06F 3/03545
See application file for complete search history.

(56) References Cited

U.S. PATENT DOCUMENTS

| | | | | |
|---|---|---|---|---|
| 5,291,213 A * | 3/1994 | Krauss | ............... | G06F 3/03546 345/164 |
| 5,861,876 A | 1/1999 | Nakayama | | |
| 2005/0243072 A1 | 11/2005 | Denoue et al. | | |
| 2006/0103066 A1* | 5/2006 | Stoll | ................. | B65H 3/5238 271/113 |
| 2006/0176286 A1* | 8/2006 | Zank | ................. | G06F 3/03545 345/179 |
| 2012/0194484 A1* | 8/2012 | Lehman | ............ | G06F 3/03545 345/179 |
| 2012/0326991 A1* | 12/2012 | Reed | .................... | G06F 3/0202 345/173 |
| 2013/0038579 A1* | 2/2013 | Boyd | ................... | B43K 25/028 345/179 |
| 2014/0268515 A1* | 9/2014 | Smoot | ............... | G06F 3/03545 361/679.01 |
| 2015/0277596 A1* | 10/2015 | Hoffman | ............... | G06F 3/016 345/179 |
| 2017/0017273 A1* | 1/2017 | Weldon | ............... | G06F 1/1681 |

FOREIGN PATENT DOCUMENTS

EP    0413607 A2    2/1991

* cited by examiner

*Primary Examiner* — Ariel A Balaoing
(74) *Attorney, Agent, or Firm* — Volpe Koenig

(57) ABSTRACT

The present invention refers to a tip arrangement (3) for a pen to be used on electronic touch-screen devices, comprising a ball (4) intended as the contact surface with the touch-screen and a supporting element (5) associated to the ball (4), which combined with said ball (4) creates an attractive magnetic interaction; the invention referring also to a pen (1) comprising said tip arrangement.

13 Claims, 2 Drawing Sheets

TIP ARRANGEMENT FOR PEN FOR ELECTRONIC DEVICE AND PEN COMPRISING SAID TIP ARRANGEMENT

TECHNICAL FIELD

The present invention refers to a tip arrangement for a pen to be used on electronic devices, and in particular electronic devices with a touch-screen display.

The invention also refers to a pen comprising the said tip arrangement.

In the context of the present invention the terms "touch-screen", "touch-screen display" and "display" are interchangeable and refer to the contact surface of a touch-screen.

Background Art

As is generally known, touch-screen electronic devices have become widespread in recent years.

It is also known that different touch-screen displays can incorporate various technologies among which also those that comprise, and make use of, magnetic sensors.

In this case the interaction with the electronic device occurs through a pen which the user moves directly on the contact surface of the electronic device.

The pens available with the currently known technologies that can be used for touch-screen interaction are generally composed of an elongated body and a flat tip rigidly attached to the elongated body or connected to it through a spherical joint.

Pens for touch-screen interaction which have an inclined tip incorporated into a rigid structure can also be found.

Although suitable for use, the above described pens have some drawbacks among which the limited width of the angle between the body of the pen and the writing surface (intended as the contact surface of the touch-screen) which might result into a less efficient and comfortable writing.

Moreover, through the currently available technology, the usage of a touch-screen pen on the touch-screen writing surface creates a non-negligible dry friction effect.

The said dry friction effect is translated into a sensory perception of the writing act which is significantly different from the one the user would get by writing with a normal pen on a piece of paper.

Please note that generally the said different perception of the writing act is not being appreciated by the user.

SUMMARY OF THE INVENTION

The technical problem at the basis of the present invention was to create a pen for touch-screen devices having the structural and functional characteristics needed to overcome the above described drawbacks of the currently available technology.

As per the invention, the said technical problem was resolved by a tip arrangement for a pen to be used on electronic touch-screen devices, comprising a ball intended as the contact surface with the touch-screen and a supporting element associated to the ball (4), which combined with said ball creates, at least during the usage of the pen, an attractive magnetic interaction.

Preferably, said supporting element is a magnetic dipole, a permanent magnet or electromagnet, although the possibility of considering as supporting element any one element or combination of elements capable of creating an attractive magnetic interaction with said ball is not excluded. An example of such a combination would comprise a paramagnetic element coupled with a magnet.

In practice, thanks to its magnetic field the above said supporting element assures that the above mentioned ball stays in place.

Preferably, the above mentioned supporting element is at least in part made of an electrically conductive material.

Preferably, the above mentioned supporting element has a circular section.

Preferably, the above mentioned supporting element includes a proximal surface which comes in contact with the above mentioned ball, where it is more preferable that the proximal surface is essentially a flat surface.

Therefore, the above mentioned ball can have a diameter which is larger, equal, or smaller than the width of the above mentioned supporting element, and thus than the width of the above mentioned proximal surface.

Preferably, the above mentioned ball is at least in part made of a electrically conductive material.

Preferably, the above mentioned ball is at least in part made of a metallic material with magnetic, ferromagnetic or paramagnetic properties.

Preferably, the above mentioned ball has an external surfaces which comprises at least two areas with a different coefficient of dynamic rolling friction with respect to the above mentioned proximal surface of the above mentioned supporting element.

In practice, the above mentioned external surface of the above mentioned ball includes a first area proximal to the above mentioned supporting element and a second area distal to the above mentioned supporting element, where preferably the coefficient of dynamic rolling friction measured between the said second area of the said external surface of the ball and the said supporting element is higher than the coefficient of dynamic rolling friction measured between the said first area of the said external surface of the ball and the said supporting element.

In this way, while using the present tip arrangement, the coefficient of dynamic rolling friction between the ball and the supporting element turns out to be favorably lower than the coefficient of dynamic rolling friction created between the ball and the touch screen writing surface, writing surface which can vary from device to device and which can therefore be more or less smooth.

Preferably, the said second area is at least half of the said external surface of the said ball, and more preferable is at least 60% of the said external surface of the said ball.

Preferably, the difference between the two said coefficients of dynamic rolling friction is obtained through the presence of one or more coating layers. Therefore, as per the invention, the above said tip arrangement preferably comprises at least a coating layer covering a portion of the above said external surface of the ball which circumscribes the above said first area and the above said second area, where at least one coating layer is made of or incorporates a "material with a high friction coefficient" or a "material with a low friction coefficient", however not excluding the possibility of creating the above said two areas through a chemical treatment process and/or through mechanical processing of at least a portion of the above mentioned external surface of the above mentioned ball, and/or mixing other various materials.

In the case of multiple coating layers, one or more "materials with a high friction coefficient" or one or more "materials with a low friction coefficient" can be considered.

"Friction material" or "material with a high friction coefficient" is intended as a material conducive to creating, on a first contact surface, a coating layer for an increased friction, or coefficient of dynamic rolling friction, between the first coating surface and the second coating surface, compared to the friction, or the coefficient of dynamic rolling friction, between the above said first contact surface and the above said second coating surface in the absence the above mentioned friction material.

"Low Friction material" (lubrificant) is intended as a material conducive to creating, on a first contact surface, a coating layer for a lowered friction, or coefficient of dynamic rolling friction, between the first coating surface and the second coating surface, compared to the friction, or the coefficient of dynamic rolling friction, between the above said first contact surface and the above said second coating surface in the absence the above mentioned low friction material.

In line with the above and as per the present invention, the said problem is also resolved by a pen for a touch-screen electronic device which includes the said tip arrangement.

In particular, the said pen includes an elongated body and the said tip arrangement to which it is attached, and possibly even detachable from the said elongated body.

Preferably, within the said pen, the said attractive magnetic interaction has an intensity which can vary and can be regulated by the user.

Preferably the above said supporting element has an adjustable magnetic capacity. In this respect, the said pen can include specially designed means of command and control of the said intensity or magnetic capacity, such as a potentiometer connected to the same supporting element.

As per the above, within the said pen, the said ball is connected to the said supporting element with the help of the magnetic attraction. Preferably said supporting element is suitable for use with balls of various diameters.

In a more favorable way, balls with a different diameter can have different characteristics also with respect to the above mentioned areas.

Therefore, as per the above, the present invention also makes available a kit which includes the said pen and multiple balls with different diameters and/or with different characteristics with respect to said areas.

In practice, according to the present invention, a tip arrangement for a pen for touch-screen capable of creating a sensorial feedback similar to the one the user can get while using a normal ballpoint pen, especially on a piece of paper, is being made available to the user.

Moreover, thanks to the tip arrangement which the present invention presents, both writing and drawing are easily and efficiently permitted even in the case of an elevated incline degree between the tip arrangement/pen and the touch-screen active surface; in particular, the said tip arrangement and thus the said touch-screen pen is offering optimal performance for a width of the incline degree with respect to the writing surface of between approx. zero and approx. 180 degrees.

As per the invention, the attractive magnetic interaction between the supporting element and the ball allows the ball to spin on its own axis when in movement and in contact with the writing surface of the touch-screen, even though generally the active surface of a touch-screen device is either made of glass or otherwise covered in a smooth material similar to glass, giving the user the above mentioned sensorial feedback typical of the normal writing with a ballpoint pen.

BRIEF DESCRIPTION OF THE FIGURES

Further characteristics and advantages of the proposed invention can be better observed by reviewing the following detailed description of some preferred, but not unique, implementation methods, herein illustrated for indicative and not limiting purposes, along with the supporting the attached drawings, where.

DETAILED DESCRIPTION OF THE INVENTION

Figure 1:
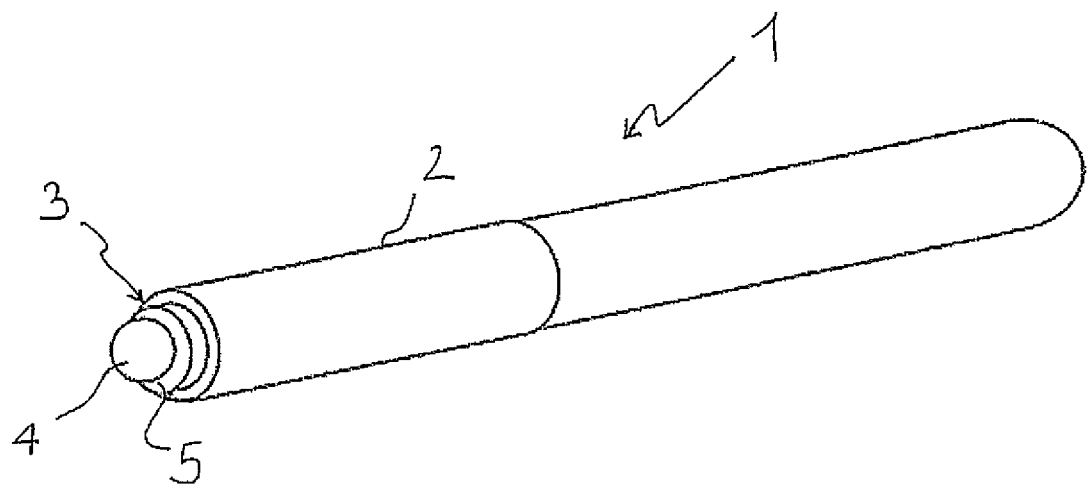
FIG. 1 illustrates in a simplified way a prospective view of a pen for a touch-screen electronic device comprising of a tip arrangement, in accordance with an implementation method proposed by the present invention, where the tip arrangement includes a ball intended to come in contact with the touch-screen and a supporting element connected to the ball.
Figure 2:
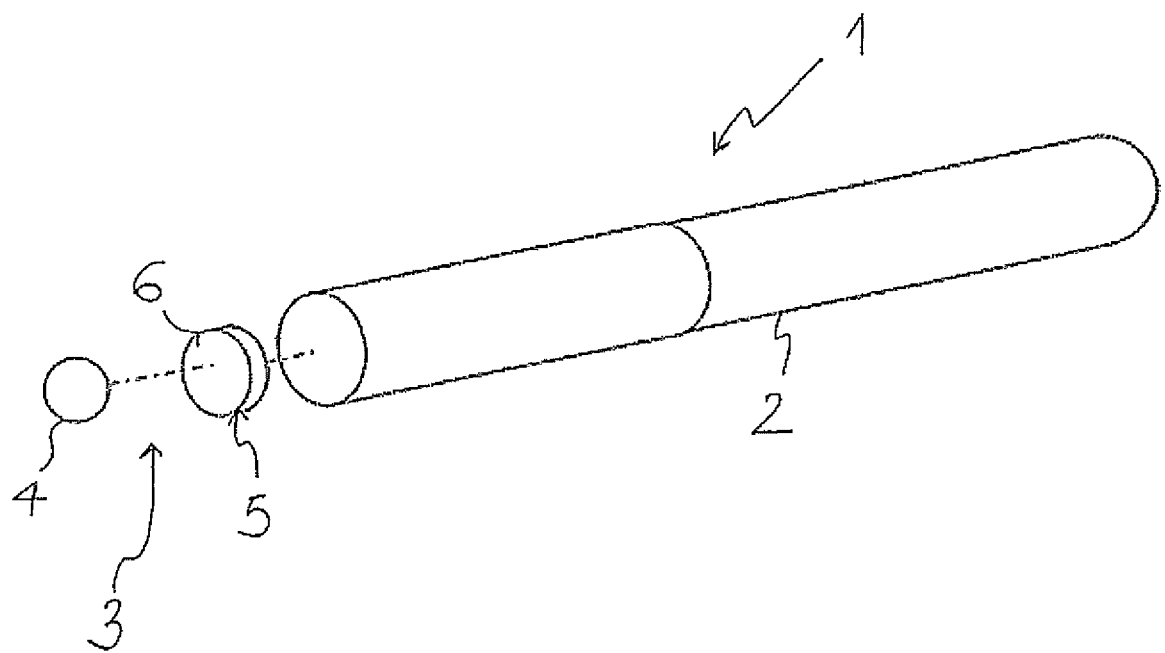
FIG. 2 illustrates FIG. 1 pen with its separate parts.
Figure 3:
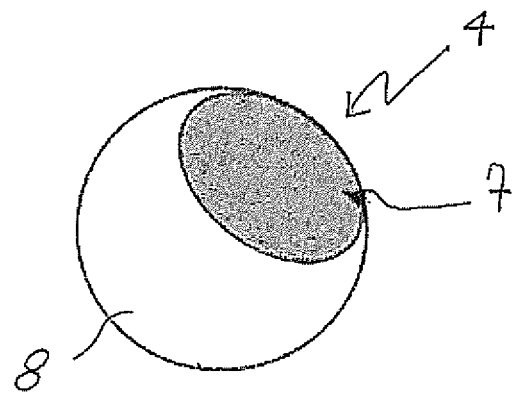
FIG. 3 illustrates a section of the FIG. 1 pen at an enlarged scale.

With regards to FIGS. 1-4, 1 refers to a pen for a touch-screen electronic device in accordance with the present invention.

In particular, pen 1 is capable of being utilized with known touch-screen electronic devices equipped with a magnetic sensor.

The pen 1 essentially comprises an elongated body 2, and a tip arrangement connected to the body 2, together referred to by 3, which at its turn includes a ball 4 and a supporting element 5 connected to the ball 4, and in particular coupled to it.

In accordance with the present invention, an attractive magnetic interaction is created between the ball 4 and the supporting element 5, at least while the pen is being utilized.

In practice, the ball 4 is intended to be the contact point with the touch-screen, meaning with the active writing surface, while the supporting element 5 is intended as support for the ball 4 and as a connecting element, which could also be detachable, between the tip arrangement 3 and the body 2 of the pen 1.

In accordance with the invention, the supporting element 5 can be a magnetic dipole, a permanent magnet or an electromagnet, although the possibility of considering as supporting element any one element or combination of elements capable of creating an attractive magnetic interaction with the ball of present tip arrangement is not excluded.

As per the example figures, the supporting element 5 has a circular section, thus preferably a cylindrical shape, and is comprised of a proximal surface 6 which comes in contact with the ball 4 which is fundamentally a flat surface, although the possibility of including a section, shape or surface different from what is illustrated in the figures above is not excluded.

With regards to the ball 4, it is worth mentioning that it is preferably at least in part made of an electrically conductive material.

Moreover, the ball 4 is preferably made of a metallic material with magnetic, ferromagnetic or paramagnetic properties.

As per the example figures above and in accordance with a preferred realization method of the present invention, it's worth mentioning that the ball 4 has an external surface including two areas which generate two different coefficients of dynamic rolling friction measured between each of the two areas and the proximal surface 6 of the supporting element 5.

In detail, the above said two areas consist of a first area 7, proximal to the supporting element 5, and of a second area 8, distal to the supporting element 5, where the dynamic rolling friction coefficient between the first area 7 and the proximal surface 6 of the supporting element 5 is lower than the dynamic rolling friction coefficient between the second area 8 and the same proximal surface 6 of the supporting element 5.

In particular, the ball's 4 second area 8 covers at least half of the external surface of the ball 4, and preferably covers at least 60% of the external surface of the ball 4, as shown in the example figures.

In accordance with a realization form of the present invention, the pen 1 includes a coating layer covering a portion of the ball 4 which delimits the second area 8, where the covering layer is essentially made of or including a material with a high friction coefficient, although the possibility of creating two or more areas with a different dynamic rolling friction coefficient as considered above, through a chemical treatment and/or mechanical processing of at least a portion of the ball's external surface, and/or assembling together different materials in order to create a ball with the above said two or more areas with a different dynamic rolling friction coefficient, is not excluded.

Should the above said coating layer covering a portion of the ball 4 be considered, the thickness of the coating layer does not depend on the ball's size, but it beneficially does not have to obstruct the capacitive contact with the touch-screen display.

Moreover, favorably, the coating layer covering a portion of the ball 4 prevents possible damage of the touch-screen display which could be caused by a ball made of a particularly hard material.

As an alternative or as an addition to the above said coating layer covering a portion of the ball 4, the present tip arrangement can also include a coating layer covering the first area 7 of the ball 4, and/or covering the above said proximal surface of the supporting element 5, where the coating layer is made of or includes a material with a lower friction coefficient, which however is not shown in the example figures.

In accordance with the invention, in the case of the present tip arrangement, thus in the case of the pen 1, the attractive magnetic interaction between the supporting element 5 and the ball 4 can have a variable intensity, which can be adjusted by the user.

Therefore, for example, the above said supporting element 5 can have an adjustable magnetic capacity.

In this respect, although not shown in the example figures, specially designed means of command and control of the said intensity or magnetic capacity, such as a potentiometer connected to an electromagnet, can also be considered.

Figure 4:
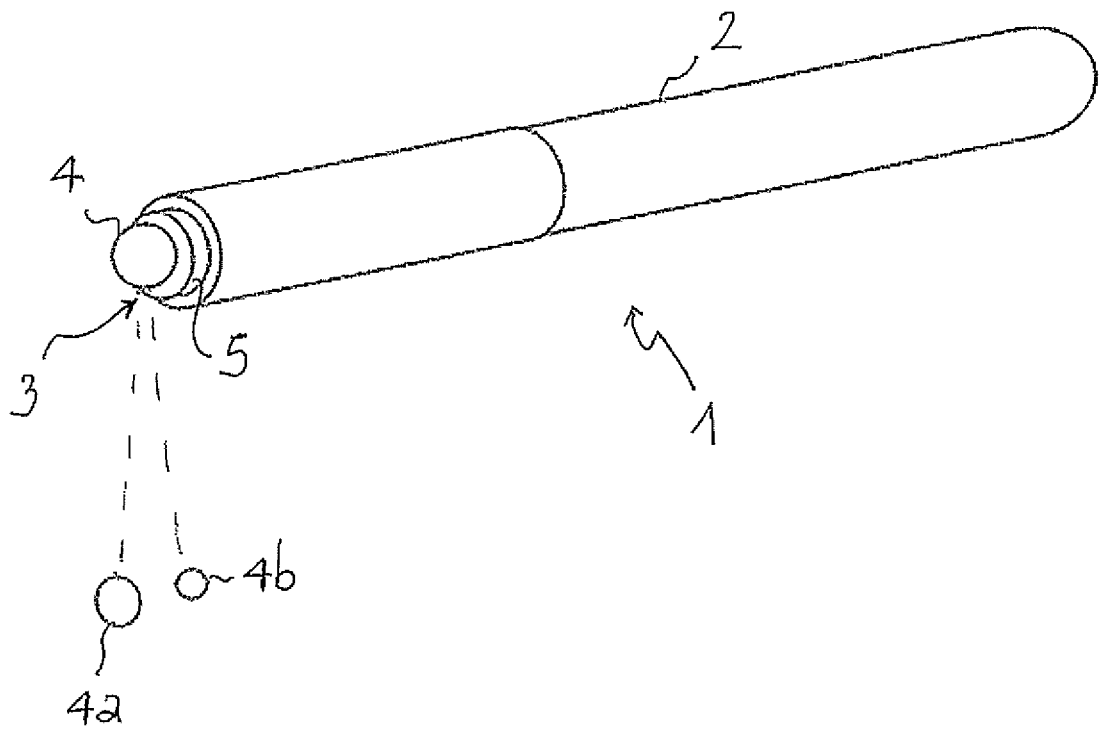
FIG. 4 illustrates the FIG. 1 pen and multiple balls of various sizes for the tip arrangement as per the present invention.

In accordance with the above and as per the invention, especially but not only in the case of an adjustable magnetic capacity or intensity of the supporting element 5, for the present tip arrangement, and thus for the present pen, balls of different sizes can be utilized, as shown in FIG. 4, where pen 1 which includes ball 4 is shown, in addition to multiple other balls 4a, 4b, having various sizes different from that of ball 4, to be used as an alternative to the latter, in order to personalize the writing experience.

Therefore, the ball 4 is advantageously connected to the supporting element 5 in a detachable way, the latter being able to be coupled with balls of different sizes, given that, in accordance with the invention, what matters is the difference between the friction (intended as the dynamic rolling friction coefficient) created between the ball and the writing surface or the active surface of the touch-screen, and the friction (intended as the dynamic rolling friction coefficient) created between the ball and the supporting element.

In particular, in accordance with the invention, the friction between the ball and the supporting element must be lower than the friction between the ball and the active surface of the touch-screen while the pen is in use.

In this way, the ball interacts with the active surface of the touch-screen by across it.

In more detail, while writing, the above said friction difference forces the ball to rotate on its axis through the contact point with the supporting element, meanwhile rolling across the writing surface, intended as active surface of the touch-screen.

In practice, the ball of the present tip arrangement is capable of easily rolling across the touch-screen display while maintaining its own fixed position on the supporting element thanks to the attractive magnetic interaction created between the ball and the supporting element.

The advantages of the present invention which resulted already from the above description can be efficiently summarized by highlighting that the present invention aims at providing a tip arrangement for a pen for touch-screen devices which is capable of creating a sensorial feedback similar to the one the user would typically get by utilizing a ballpoint pen on a piece of paper.

Moreover, thanks to the tip arrangement proposed by the present invention, both writing and drawing are easily and efficiently allowed even in the case of a high degree of inclination of the tip arrangement (so between the pen and the active surface of the touch-screen), and in particular the tip arrangement and thus the pen proposed by the present invention offer optimal performances for a width of the incline degree with respect to the writing surface of between approx. zero and approx. 180 degrees, width of the incline degree at which it is normally possible to write with a fountain pen or pencil, for example.

In practice, as per the invention, the attractive magnetic interaction between the supporting element and the ball allows the ball to spin on its own axis when in movement and in contact with the writing surface of the touch-screen, even though generally the active surface of a touch-screen device is either made of glass or otherwise covered in a smooth material similar to glass, giving the user the above mentioned sensorial feedback typical of the normal writing with a ballpoint pen, as well as a major writing angle freedom, practically arbitrary.

In addition, it is worth mentioning that the tip arrangement proposed by the present invention can be coupled with an ordinary pen provided by currently available technology.

In order to satisfy contingent and specific requirements, an industry expert could bring numerous variations and adjustments to the present invention in the realization forms previously illustrated and described, all of which included in the scope of protection of the invention as defined below by the following claims.

The invention claimed is:

1. Tip arrangement for pen for electronic touch-screen devices, said tip arrangement comprising a ball configured to contact the touch-screen and a supporting element combined with said ball, wherein a magnetic attraction interaction is caused between said ball and said supporting element, wherein said supporting element comprises a proximal surface in contact with said ball, and wherein said ball has an outer surface comprising at least two zones developing two respective coefficients of dynamic rolling friction, said coefficients being different from one another and measured between each of said two zones and said proximal surface of said supporting element.

2. The tip arrangement according to claim 1, wherein said supporting element is at least partially made of an electrically conductive material, wherein said supporting element is at least one of: a magnetic dipole, a permanent magnet or an electromagnet.

3. The tip arrangement according to claim 1, wherein said supporting element has circular cross-section.

4. The tip arrangement according to claim 1, wherein said proximal surface is a flat surface.

5. The tip arrangement according to claim 1, wherein said ball is at least partially made of at least one of: an electrically conductive material, a metal material having magnetic properties, a metal material having ferromagnetic properties or a metal having paramagnetic properties.

6. The tip arrangement according to claim 1, wherein said at least two zones comprises a first zone proximal to said supporting element, and a second zone distal from said supporting element, wherein said coefficient of dynamic rolling friction between said first zone and said proximal surface of the supporting element is lower than said coefficient of dynamic rolling friction between said second zone and said proximal surface of the supporting element.

7. The tip arrangement according to claim 6, wherein said second zone extends for at least half of said outer surface of said ball, wherein said second zone extends for at least 60% of said outer surface of said ball.

8. The tip arrangement according to claim 6, comprising a covering layer extended on a portion of said ball and delimiting said second zone, wherein said covering layer is constituted by or comprises a material having high friction coefficient.

9. The tip arrangement according to claim 1, wherein said at least two zones are obtained by at least one of: a chemical treatment; a machining of at least one portion of said outer surface of said ball; or by assembling materials different from one another to make said ball.

10. The tip arrangement according to claim 1, comprising a covering layer extended on at least one of: a first zone of said ball or on said proximal surface of said supporting element, wherein said covering layer comprises a material having low friction coefficient.

11. A pen for an electronic touch-screen device, said pen comprising an elongated body and a tip arrangement according to claim 1, wherein said tip arrangement is combined with said body, in a removable way.

12. The pen according to claim 11, wherein said magnetic attraction interaction has a variable intensity and can be adjusted by a user.

13. A kit comprising a pen according to claim 11, and a plurality of balls, wherein the plurality of balls comprise at least one of: diameters different from one another or at least two zones with different friction properties.

* * * * *